United States Patent
Weinblatt et al.

(10) Patent No.: US 6,993,284 B2
(45) Date of Patent: Jan. 31, 2006

(54) INTERACTIVE ACCESS TO SUPPLEMENTARY MATERIAL RELATED TO A PROGRAM BEING BROADCAST

(75) Inventors: Lee S. Weinblatt, Teaneck, NJ (US); Thomas Langer, Teaneck, NJ (US)

(73) Assignee: Lee Weinblatt, Teaneck, NJ (US)

( * ) Notice: Subject to any disclaimer, the term of this patent is extended or adjusted under 35 U.S.C. 154(b) by 320 days.

(21) Appl. No.: 10/092,045

(22) Filed: Mar. 5, 2002

(65) Prior Publication Data

US 2003/0022622 A1 Jan. 30, 2003

Related U.S. Application Data

(60) Provisional application No. 60/273,745, filed on Mar. 5, 2001.

(51) Int. Cl.
*H04H 1/00* (2006.01)

(52) U.S. Cl. .................. 455/3.01; 455/3.05; 455/3.06; 455/132; 455/149; 725/133; 725/139; 725/141; 725/32

(58) Field of Classification Search .............. 455/3.01, 455/3.02, 3.03, 179.1, 43, 414.1, 414.2, 414.3, 455/3.05, 3.06, 132, 149; 340/7.48, 7.51; 725/133, 139, 141, 32
See application file for complete search history.

(56) References Cited

U.S. PATENT DOCUMENTS

| 4,718,106 A | 1/1988 | Weinblatt ...................... 455/2 |
|---|---|---|
| 5,457,807 A | 10/1995 | Weinblatt ...................... 455/2 |
| 5,570,295 A | 10/1996 | Isenberg et al. ............ 364/514 |
| 5,630,203 A | 5/1997 | Weinblatt ...................... 455/2 |
| 5,708,478 A * | 1/1998 | Tognazzini ................. 348/552 |
| 5,761,606 A | 6/1998 | Wolzien ...................... 455/6.2 |
| 5,905,865 A | 5/1999 | Palmer et al. ......... 395/200.47 |
| 5,929,849 A | 7/1999 | Kikinis ....................... 345/327 |
| 6,037,932 A | 3/2000 | Feinleib ...................... 345/327 |
| 6,058,430 A | 5/2000 | Kaplan ....................... 709/245 |
| 6,098,106 A | 8/2000 | Philyaw et al. ............. 709/238 |
| 6,101,381 A * | 8/2000 | Tajima et al. ............ 455/414.2 |
| 6,152,172 A | 11/2000 | Christianson et al. ....... 137/554 |
| 6,163,803 A | 12/2000 | Watanabe ................... 709/217 |
| 6,687,498 B2 * | 2/2004 | McKenna et al. ........ 455/422.1 |
| 6,765,474 B2 * | 7/2004 | Eaton et al. ............... 340/7.43 |
| 2002/0059590 A1 * | 5/2002 | Kitsukawa et al. ........... 725/36 |
| 2002/0073042 A1 | 6/2002 | Maritzen et al. |
| 2002/0092025 A1 * | 7/2002 | Klumpp ...................... 725/62 |

(Continued)

FOREIGN PATENT DOCUMENTS

EP 1 133 090 A2 12/2000

(Continued)

*Primary Examiner*—Sonny Trinh
*Assistant Examiner*—Khai Nguyen
(74) *Attorney, Agent, or Firm*—Cohen, Pontani, Lieberman & Pavane (57) ABSTRACT

A method and apparatus for, interactively with a broadcast program that is being performed, enabling access to supplementary materials related to the program from a broadcast signal that is a combination of a programming signal and a supplementary materials signal. The broadcast output signal is received at a location of an audience. The programming signal of the received output signal is performed for the audience, with reproduction equipment. A signal related to the supplementary material signal is extracted from the received broadcast signal. Access to the supplementary material corresponding to the supplementary material signal is enabled in response to an interactive control signal actuated by a member of the audience tuned to the programming signal being performed, and based on the extracted signal.

46 Claims, 6 Drawing Sheets

U.S. PATENT DOCUMENTS

2003/0009770 A1 * 1/2003 Tantawy et al. ............ 725/133
2003/0109219 A1 * 6/2003 Amselem ................... 455/3.06
2003/0121059 A1 * 6/2003 Ramaswamy ............... 725/141

FOREIGN PATENT DOCUMENTS

| FR | 2 817 061 A1 | 5/2002 |
| --- | --- | --- |
| WO | WO 94/24820 | 10/1994 |
| WO | WO 01/15447 A1 | 1/2001 |
| WO | WO 01/17262 A1 | 3/2001 |
| WO | WO 01/05173 A2 | 1/2002 |
| WO | WO 97 21200 | 6/2002 |
| WO | WO 02/080548 A2 | 10/2002 |

* cited by examiner

INTERACTIVE ACCESS TO SUPPLEMENTARY MATERIAL RELATED TO A PROGRAM BEING BROADCAST

CROSS REFERENCE TO RELATED APPLICATIONS

This application claims the benefit of U.S. Provisional Application No. 60/273,745 filed Mar. 5, 2001.

The subject matter of this application is related to the subject matter of application Ser. No. 09/519,248 filed Mar. 6, 2000 entitled "Audience Detection" which is hereby incorporated by reference in its entirety.

FIELD OF THE INVENTION

This invention is directed to an interactive technique applied while an audience is listening to and/or watching a program broadcast from a programming signal source and performed by reproduction equipment and, more particularly, to interactive broadcasting that enables individual members of that audience to readily obtain supplementary, program-related materials.

BACKGROUND OF THE INVENTION

When a program is broadcast, the information it contains may be more limited than the program provider wants to provide and less than the audience member (referred to hereinafter as a "viewer" or "participant") is interested in obtaining. The "program" can be audio and/or video, commercial (e.g. advertisement) and/or non-commercial (e.g. a TV show), and is obtained as a programming signal (e.g. a television signal) from a program signal source (e.g. a television station) originated by a program provider (e.g. an advertiser). The "broadcast" of the program can be over the airwaves, cable, satellite, or any other signal transmission medium. This term also applies to playback from recording media such as audio tape, video tape, DAT, CD-ROM, and semiconductor memory. An "audience" for such program reproduction is constituted of the persons who perceive the program.

The program is "performed" by any reproduction equipment which results in some form of output that is perceptible to human beings, the most common being video and audio. The "reproduction equipment" is any and all types of units to convert a broadcast signal into human perceptible form.

The audience can be described as being "tuned" to a program when the signal source is a TV or radio broadcast station. This term may be less commonly applied when the signal source is a tape recorder. However, for the sake of brevity and convenience, the word "tuned" is applied herein to all situations in which a person chooses to be an audience member of a particular program, whether it be by twisting a dial, operating a remote control, or popping a cassette into a tape recorder for playback.

It can be readily appreciated that TV programs are restricted to a particular length due to the time period allocated to a TV show, and the high cost charged for broadcasting a commercial advertisement (referred to herein interchangeably as "commercial" or "advertisement") based on its duration. Many illustrations can be given that demonstrate the need to provide materials to supplement the TV show and/or advertisement. For example, consumers may seek detailed information about an advertised product. A news program could provide viewers with historical information about a person or place currently in the news. Government institutions could provide application forms related to announcements for public services. A retailer could make available an incentive reward, such as discount coupons, to purchase its products. Other rewards could also be available, such as free theater tickets for viewers who qualify by participating in a survey or in a game. All such supplementary program-related materials, in tangible and intangible form, be they information, rewards or anything else, are collectively referred to herein as "supplementary materials". Two specific types of supplementary materials that are referred to in the ensuing explanation of the present invention are supplemental information and rewards.

Broadcast programs have been providing telephone numbers and uniform resource locators (URLs) to viewers for obtaining the supplementary materials. However, the need to memorize or write down the telephone numbers and/or URLs is an inconvenience as well as a source for error. Consequently, prior art techniques have been proposed for interactive access to such supplementary materials. The word "interactive" as utilized herein denotes an activity that takes place during broadcast of the program. The aim of such interactive access is to enable and facilitate access to the supplementary materials, immediately or at a later time, without having to write down or memorize anything. Access should be gained with some simple manual intervention by the viewer, completely automatically, or a combination of the two.

Several techniques for interactive access to web sites on the Internet are known. However, such techniques have various shortcomings. For example, the use of an additional computer with a separate display is required, and the interactive access takes over a communication line.

SUMMARY OF THE INVENTION

One object of the present invention is to provide an improved technique for obtaining supplementary program-related material for broadcast programs.

Another object of the present invention is to provide an improved interactive program broadcasting technique.

A further object of the present invention is to advantageously combine interactive program broadcasting with the collection of audience surveying information.

Yet another object of the present invention is to provide supplementary program-related material that is customized for the participant.

These and other objects are attained in accordance with one aspect of the present invention directed to a method and apparatus for interactively with a broadcast program that is being performed enabling access to supplementary materials related to the program from a broadcast signal that is a combination of a programming signal and a supplementary materials signal. The broadcast output signal is received at a location of an audience. The programming signal of the received output signal is performed for the audience, with reproduction equipment. A signal related to the supplementary material signal is extracted from the received broadcast signal. Access to the supplementary material corresponding to the supplementary material signal is enabled in response to an interactive control signal actuated by a member of the audience tuned to the programming signal being performed, and based on the extracted signal.

DETAILED DESCRIPTION OF THE DRAWINGS

The present invention is preferably embodied as an enhancement of the invention disclosed in the above-mentioned U.S. Ser. No. 09/519,248. In so doing, the audience detection features of that invention are combined to great advantage with program-related, supplementary material capabilities, as explained in detail below.

Audience survey information has been obtained in the past by audience measurement and market research organizations for advertisers and broadcasters. For example, advertisers are interested in knowing the number of people exposed to their commercials. Also, broadcasters use statistics on audience size and type for setting their advertising rates.

It is of interest to survey an audience not only in terms of its number but also to obtain characteristics of its individual members. Thus, for example, advertisers wish to identify the audience members by economic and social categories. This is possible if individual members of the audience can be identified.

U.S. Ser. No. 09/519,248 discloses an effective approach for identifying audience members and providing viable information about them personally (e.g. their profile) and their broadcast-program-viewing behavior. That technique provides an advantageous platform for the interactive program broadcasting technique of the present invention because of an overlap between the hardware components and the software modules they require.

In the ensuing discussion and the drawings corresponding thereto, the same drawing reference numbers are used for the components disclosed in U.S. Ser. No. 09/519,248. Those components that have been added to implement the present invention are easily identifiable as numbers 100 and above. Moreover, when a component or signal from U.S. Ser. No. 09/519,248 has been modified for implementing the present invention, its number is retained, but with an appended "A".

To conduct an audience detection operation, or survey, participants are selected by the surveying organization based on certain criteria. These criteria can be, for example, age, income, geographic location, sex, and level of education which together constitute a participant's profile. The broadcasting organization and/or advertisers may require an analysis of their listeners which is broken down into one or more of these categories. The profile of each participant is stored in memory as part of a database. Each participant is given a portable device to wear on a regular basis as an article of clothing. For example, such a portable device might be a watch for men or a bracelet for women.

Figure 1:
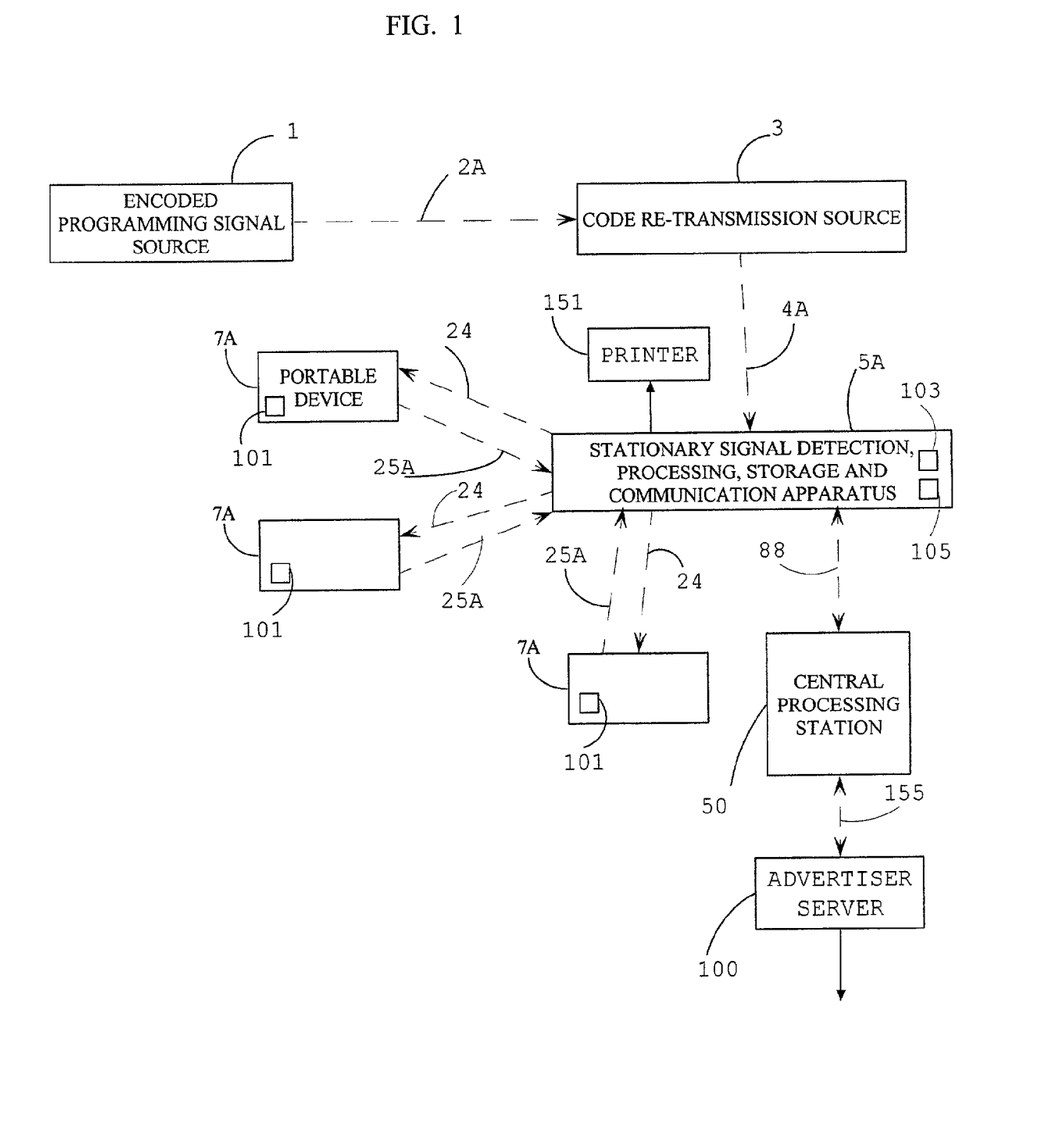
FIG. 1 is a schematic block diagram of the invention.

The present invention relies on the following key components. As shown in FIG. 1, an encoded signal is generated by a programming signal source 1, such as a television ("TV") broadcast station. Its broadcast output signal 2A, which is a combination of the programming signal and supplementary material code signals, is received by code retransmission source 3. Code retransmission source 3 can be capable of suitably reproducing the programming signal for video and/or audio performance. However, its key function is to detect the code signals in the signal 2A received from programming signal source 1, and then to retransmit the code signals in suitable fashion as output signal 4A, as explained below. The code signals re-transmitted by code retransmission source 3 are detected and processed by stationary apparatus 5A. If supplemental information (see below) is being offered, indicator 103 is activated. If a reward is being offered (see below), indicator 105 is activated. These indicators can be visual, audible and/or tactile (e.g. vibration).

A plurality of portable devices 7A operate cooperatively with stationary apparatus 5A, such as in response to query signal 24 therefrom. Signal 24 is used to identify the audience members, i.e. the participants in attendance within range of signal 24, and to determine whether any such participant has actuated a request for supplementary materials, as per signal 25A outputted by such device 7A. Supplementary material can be printed out by printer 151.

Stationary apparatus 5A is in communication with central processing station 50 to periodically upload data stored therein and to download data therefrom that it requires for operational purposes. Finally, central processing station 50 is in communication with advertiser server 100. Data for enabling the advertiser to provide supplementary materials requested by participants is downloaded from central processing station 50 to advertiser server 100, and operational data is uploaded from advertiser server 100 to central processing station 50. Details of these key components are provided below. However, a brief explanation of certain known audience surveying techniques is deemed useful at this point.

Automated audience surveying techniques are known in which the test participants forming the audience need only play a passive role. For example, it is known to utilize a program code transmitted by a broadcast station in combination with a programming signal. The program code identifies the program which is then in the course of being performed with the programming signal into which the program code was encoded. As disclosed in U.S. Pat. No. 4,718,106 issued to Lee S. Weinblatt, the transmitted program code is detected by a receiver and reproduced by a speaker. The speaker produces pressure waves in the air that can be detected by a microphone, for example, and with a frequency that is in what is scientifically regarded as the audible range of human hearing. Such pressure waves, or signals, are referred to as acoustic. An acoustic signal is regarded as being audible, irrespective of whether it is actually perceived by a person, as long as it can be produced by a conventional speaker and detected by a conventional microphone. The audible acoustic signal is detected by a microphone and associated circuitry embodied in a portable device worn by the test participants, and data on the incidence of occurrence and/or the time of occurrence of the acoustic signal, and the program code it contains, are stored and analyzed to provide an audience survey. The use of this wireless approach for transmitting signals from the receiver to the portable device via the speaker/microphone arrangement provides a highly flexible approach for collecting audience survey information from many audience members in a variety of environments and for different types of programs from a plurality of programming signal sources.

Variations of this passive technique can be found in U.S. Pat. Nos 5,457,807 and 5,630,203, both also issued to Mr. Weinblatt.

Returning now to an explanation of the present invention, the programming signal is encoded with the following data. A program code (or survey code) identifies the program being broadcast. A discussion of such encoded program signals can be found in the above-mentioned Weinblatt patents, and such discussion found therein is hereby incorporated herein by reference. The supplementary material is identified by supplementary material codes, such as a supplementary information code and a reward code. The supplemental information code identifies the specific supplemental information that can be requested by the participants. When some type of reward is available in association with the broadcast program, such as an advertiser offering a discount coupon applicable toward purchase of the product being advertised, a reward code is provided to identify the specific reward. Thus, the conventional programming signal is encoded with these three separate, discreetly detectable and identifiable codes, namely a program code, a supplemental information code and a reward code. The code signals can be either analog or digital. The specifics do not form a part of the present invention. The coding, transmission, detection and decoding of such code signals are conventional and readily apparent to one with ordinary skill in the art. Details thereof would add unnecessarily to the length and complexity of this description. Consequently, such details are not provided herein.

Details of code re-transmission source 3 can also be found in the above-mentioned Weinblatt patents, and such details found therein are hereby incorporated herein by reference. Suffice it to say that code re-transmission source 3 is preferably a conventional component of a commercially available video and/or audio instrument, such as a TV set. The conventional component of interest could be, for example, the TV's speaker. No retrofitting of the instrument would be required in order for such component to function as a code re-transmission source. In such case, the output 4A of code re-transmission source 3 to stationary apparatus 5A would be in the form of an acoustic signal containing the three above-mentioned codes. See U.S. Pat. No. 4,718,106. However, it is also contemplated that some relatively minimal circuitry could be added to detect, process and retransmit the codes, in accordance with the disclosure of the above-mentioned Weinblatt patents, namely U.S. Pat. Nos. 5,457,807 and 5,630,203.

The reception location that stationary apparatus 5A would typically be placed within is an area containing the reproduction equipment for reproducing the video and/or audio programming signal. The area would also be of sufficient size to accommodate an audience, preferably several participants. An example would be a room with a TV and seating capacity for several persons. Stationary apparatus 5A is a self-contained, relatively small and unobtrusive unit that can be placed on a surface in the room in such a way that communication between it and the portable devices worn by persons in the room is not blocked. To some extent, the restrictions on its placement depend on the nature of the communication signals, with radio signals providing a higher degree of flexibility than infrared signals, for example. The installation of stationary apparatus 5A is very simple in that it must be plugged into a wall outlet socket to receive power. Also, to enable data communication with central processing station 50, apparatus 5A is connected to a telephone line, ISDN line or cable, for example, or a wireless communication system can be used, such as satellite or cellular. Only a one time, fast, simple installation of apparatus 5A is involved that requires no retrofitting of other apparatus in the house.

Alternatively, stationary apparatus 5A could have its circuitry incorporated into the electronics of the TV being used as the code re-transmission source 3. For example, the electronics could be fabricated on the same semiconductor chip used to control operation of the TV and the viewing of programs on it. Such TV chips are becoming more sophisticated as modern TVs are being provided with added functionality increasingly approaching that of a computer.

Each of the participants is provided with a customized, portable device 7A. All of the portable devices have identical circuitry. They are made unique, however, by virtue of the data stored therein. In particular, stored in each one is a unique ID code which can be used to identify its wearer, as explained below. Consequently, the devices are specifically assigned to a particular person and must not be interchanged among the various wearers. Also, each portable device is provided with a unique delay period. The reason for this feature will become apparent from the description provided below.

In addition, each portable device 7A is equipped with a button 101 that is usable by its wearer to request program-realted, supplemental information and/or the reward being offered, as explained below.

Figures 2, 3:
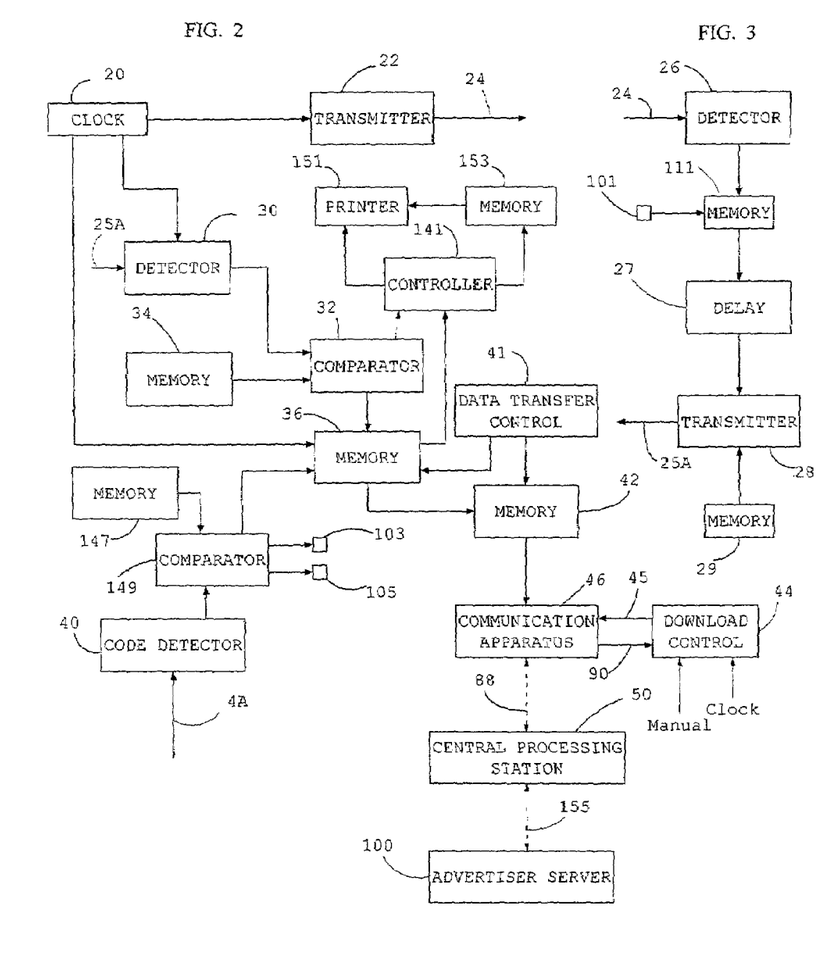
FIG. 2 shows details of the stationary apparatus.
FIG. 3 shows details of the portable devices.
Figure 4A:
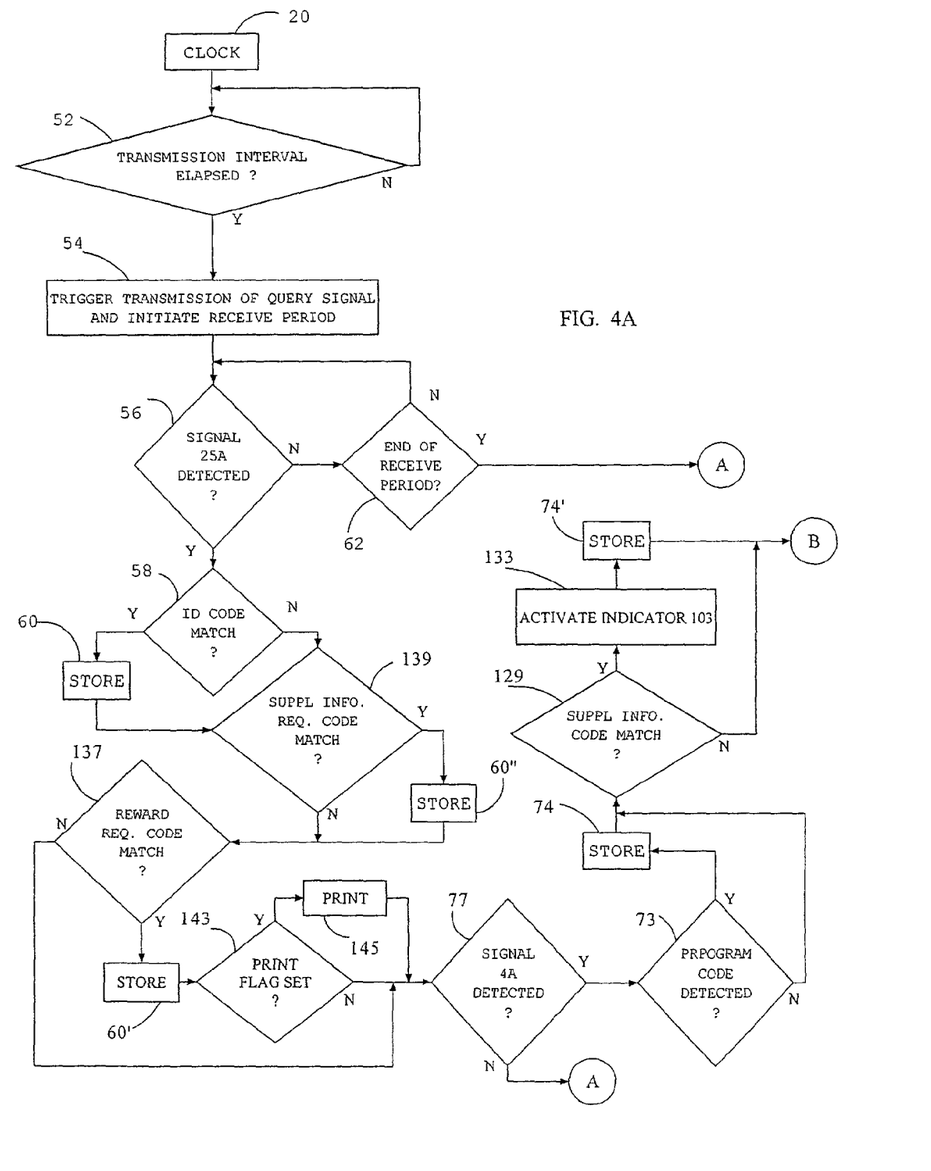
FIGS. 4A and 4B, when combined, are a flow chart showing operations performed by the stationary apparatus.
Figure 4B:
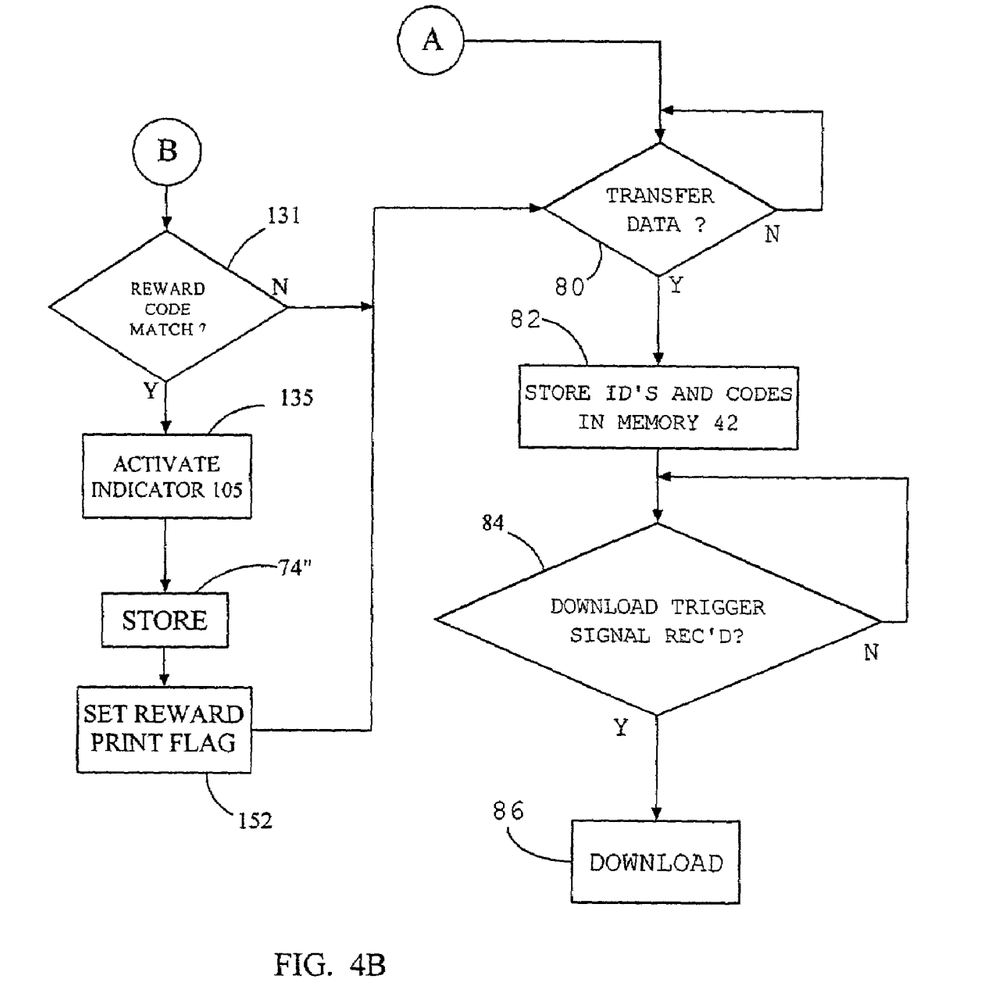
Figure 5:
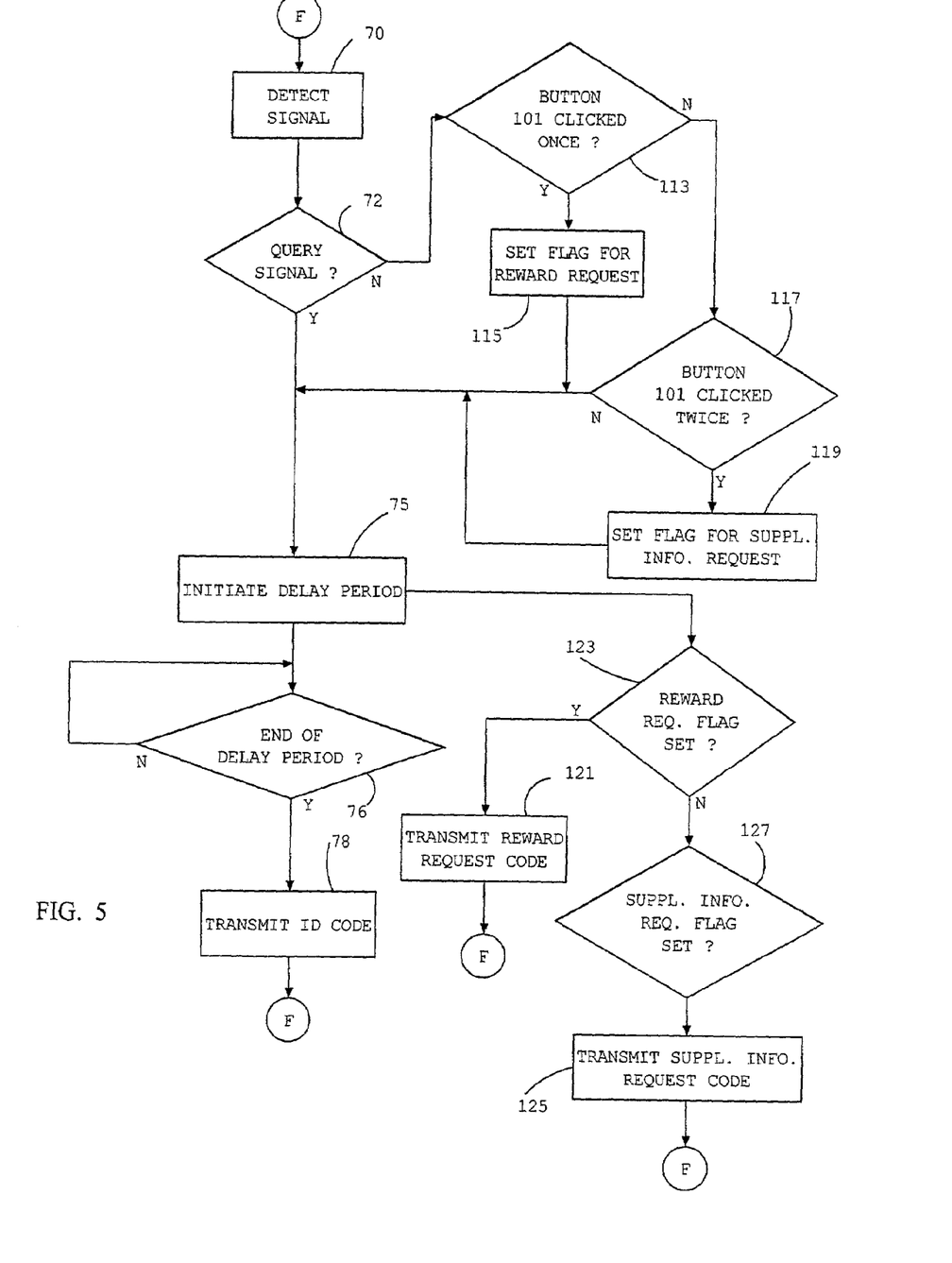
FIG. 5 is a flow chart showing operations performed by the portable device.

Details of stationary apparatus 5A and portable device 7A will now be explained in association with the schematic diagrams of FIGS. 2 and 3, and the flow charts of FIGS. 4A, 4B and 5. FIGS. 2 and 3 depict the hardware features of the apparatus, while FIGS. 4A, 4B and 5 show the operations performed by the hardware. The operations shown in FIGS. 4A, 4B and 5 can be implemented, for example, by a suitable microprocessor receiving input signals and generating control signals responsive thereto. The depictions in FIGS. 2–5 are illustrative, and various alternatives for the specific implementations will be readily apparent to anyone with ordinary skill in the art.

At preset transmission intervals which are actuated by clock 20, transmitter 22 emits a query signal 24 from stationary apparatus 5A. See also 52 and 54 in FIG. 4A. The nature of this query signal is a matter of engineering choice and can be, for example, acoustic, radio or infrared. Detector 26 in portable device 7A is designed to detect query signal 24 and identify it as that particular signal. Thus, as shown in FIG. 5, detector 26 will detect a signal, as at 70, and a determination is then made at 72 whether the detected signal is the query signal. If so, the above-mentioned delay period will be initiated at 75 and performed by delay circuit 27 (FIG. 3). When the end of the delay period is reached, as determined at 76, transmitter 28 of portable device 7A will transmit the pre-stored ID code signal, as at 78, which is retrieved from memory 29. Thus, each of portable devices 7A within range of transmitter 22 (i.e. worn by those persons within the reception location and thus forming the audience in attendance) will react to query signal 24 by transmitting its unique ID code signal as part of output signal 25A. However, since the delay period of each portable device 7A is unique, as mentioned above, this transmission of ID signals by the plurality of portable devices in the room will be staggered so that no ID signal "steps on" another.

If the participant chooses to request the supplementary materials, he can do so by depressing button 101 on portable device 7A. More specifically, when a program is associated with supplemental information and/or a reward, the corresponding respective codes are also encoded into the programming signal, as explained above. When these codes are detected and the availability of supplementary materials is interactively made known to the participant, as explained below, a manual selection can be made with button 101. More specifically, portable device 7A includes memory 111 which stores flags that can be set by button 101. When button 101 is clicked once, as per step 113 (FIG. 5), a "reward request" flag is set, as per step 115. When button 101 is double-clicked in rapid succession, as per step 117, a "supplemental information request" flag is set, as per step 119. Of course, two separate buttons can also be used for these tasks, but one is preferable in view of the relatively small size which is preferred for the portable device 7A.

When the delay period ends, as determined by step 76, a "reward request" code signal is retrieved from memory 29 and transmitted by portable device 7A, per step 121, if the corresponding flag has been set, as determined by 123. Likewise, a "supplemental information request" code signal is retrieved from memory 29 and transmitted, per step 125, if the supplemental information request flag has been set, as determined per step 127. The ID code, reward request signal and supplemental information request signal are preferably combined into an analog or digital signal and transmitted together by transmitter 28 as signal 25A. For example, the three signals could be a digital data string, with the first five bits (following an appropriate header, for example) being the ID code, the next three bits being the reward request code signal, and the following three bits being the signal information request code signal. The two latter signals are the same regardless of the supplementary materials because they always convey the same information (i.e. request made or not made). This is readily implemented by anyone with ordinary skill in the art and, therefore, details thereof are not deemed necessary.

The signals 25A from the respective transmitters 28 of portable devices 7A are received by detector 30 of stationary apparatus 5A within a receive period initiated by operation 54 (see below). Operation 56 in FIG. 4A determines whether a signal 25A has been detected by detector 30. This determination is made in a conventional fashion. Comparator 32 performs a matching test, as at 58, to determine whether the signal at its input matches any of the pre-stored ID codes in memory 34. If so, then operation 60 stores the detected ID code in memory 36.

Likewise, comparator 32 checks whether a match is found for the reward request code, per step 137, and/or the supplemental information request code, per step 139, which codes are also pre-stored in memory 34. If a match is found, then steps 60' and 60", respectively, store the reward request code and the supplemental information request code in memory 36.

In accordance with a salient aspect of the present invention when signal 25A includes a reward request code, and a print flag has been input to controller 141 (see below for details), as determined per steps 143, the reward is printed shortly after by printer 151 per step 145. This is advantageous to a TV advertiser, for example, because the viewing experience creates an immediate desire in the participant to purchase the advertised product. This desire has an initially high level of interest during and shortly after the broadcast, but decreases sharply during a falloff period in the hours that follow. However, if the participant receives an immediate reward while the level of interest is still high, in the form of a discount coupon for example, an incentive is established for the participant to retain a high level of interest, or at least higher than it would be otherwise, well beyond the falloff period. Also, the prospect of receiving an immediate reward can convert an attitude of annoyance at having a show interrupted by an unwanted commercial into an attitude of at least tolerance and perhaps even a degree of interest.

If it is determined at 56 that no signal 25A has been detected, then a check is performed at 62 whether the end of the receive period has been reached. The duration of this receive period is set such that it is somewhat longer than the longest delay period of any of the portable devices. This enables the proper reception and processing of signals 25A from all of the portable devices 7A. If the end of the receive period has not yet been reached, then the flow is returned to the signal detection 56. However, if the end of the receive period has been reached, then the end of this phase of the operation is used to trigger data transfer 80, as described below with respect to FIG. 4B.

The above-described codes broadcast within encoded programming signal 2A are re-transmitted by code retransmission source 3 as signal 4A which is received by code detector 40 of stationary apparatus 5A, as at 77 (FIG. 4A). A determination is then made, per 73, as to whether a program code has been detected. For example, all the expected program codes are pre-stored in memory 147 (FIG. 2). Comparator 149 compares the output signal from code detector 40 with the codes pre-stored in memory 147. If step 73 finds a match, that code is stored in memory 36, per step 74. Likewise, the output of code detector 40 is checked whether it matches a pre-stored (in memory 147) supplemental information code, as at 129 (FIG. 4A), and a pre-stored (in memory 147) reward code, as at 131 (FIG. 4B). Indicator 103 is activated if a supplemental information code is present, and indicator 105 is activated if a reward code is present, as per steps 133 and 135, respectively. Each of these detected codes outputted from code detector 40 is stored in memory 36, as at 74' and 74", respectively.

The print function is carried out as follows. When the reward code is identified in step 131, step 152 sets a reward print flag in memory 36 which is input to controller 141 thereby readying a print operation should any of the participants in attendance choose to request one by clicking button 101. Controller 141 in FIG. 2 also receives an input from comparator 32, and it carries out steps 143 and 145 (FIG. 4A). More specifically, when the print flag has been set in step 152, indicating that the broadcast program is associated with a reward, and a reward request code has been detected, per step 137, indicating a participant's desire to receive that reward, the controller 141 proceeds to carry out the immediate printing of that reward with printer 151. Specifically, the reward code stored in memory 36 in association with that participant's ID code (as explained below) is retrieved by controller 141 and used to point to the corresponding reward print data pre-stored in memory 153. That print data can be input into the memory 153 in various ways. For example, the data can be provided from advertiser server 100 via central processing station 50 and communication apparatus 46.

As explained just-above, memory 153 has pre-stored therein print data for several different types of rewards. Which reward is printed depends on the reward code stored in memory 36 (as having been included in signal 4A) and then retrieved by controller 141 to point to the pre-stored data in memory 153 which is retrieved and inputted to printer 151. This embodiment controls the reward which is printed out based solely on the reward code extracted from signal 4A.

It is highly desirable to control which reward is printed not only based on the detected reward code but also based on the profile of the participant making the request. For example, different rewards may be appropriate depending on whether the participant making the request interactively is an adult or a child, a male or a female, an English speaker or a Spanish speaker, on the east coast or the west coast, a smoker or a non-smoker, and so on. Moreover, even though a reward is offered in the program being broadcast, it may be desirable to block its availability to certain participants (e.g. cigarette coupons for children). The present invention makes it possible to provide a customized interactive access to the printing of a reward, for example, by interposing a table between memory 36 and memory 153 that provides a correspondence for relating the participant's ID code to the rewards pre-stored in memory 153. Such a table can be stored in the controller or in memory 153, for example. The inputs to the table would be ID codes and the outputs would be address pointers to the pre-stored printing data (or nothing if it is desired to block printing of a particular reward to a particular participant). The table can be generated at the central processing station 50 and/or advertiser server 100. It is based on the participants' profiles. The generation of such a table is well within the capability of anyone with ordinary skill in the art and, thus, specific details of how this is done are not deemed necessary. The table is downloaded to the stationary apparatus 5A as necessary when changes are made or on a regular schedule, such as nightly.

For any given measurement period, as explained below, memory 36 has stored therein a combination of the ID codes for all the audience members who are currently in attendance together with the program code, supplemental information code and reward code for the particular program being viewed by that audience during such time period. In addition, the reward request code and the supplemental information request code are stored. The output of clock 20 can also be used to time stamp the stored ID's and/or the stored surveying codes. The following chart serves to illustrate this with an arbitrarily chosen example.

| No. | Program Code | Supplemental Info. Code | Supp. Info. Requested? | Reward Code | Reward Req.? | ID Code | TIME |
|---|---|---|---|---|---|---|---|
| 1 | 01110010 | 000 | 0 | 000 | 0 | 00010 | 9:45 |
| 2 | 01110010 | 000 | 0 | 000 | 0 | 01110 | 9:45 |
| 3 | 01110010 | 010 | 0 | 000 | 0 | 00010 | 9:46 |
| 4 | 01110010 | 010 | 0 | 000 | 0 | 01110 | 9:46 |
| . | . | . | . | . | . | . | . |
| 13 | 01110010 | 011 | 1 | 001 | 0 | 00010 | 9:50 |
| 14 | 01110010 | 011 | 0 | 001 | 0 | 01110 | 9:50 |
| . | . | . | . | . | . | . | . |
| 45 | 00110100 | 100 | 0 | 110 | 1 | 00010 | 10:05 |
| 46 | 00110100 | 100 | 1 | 110 | 1 | 01110 | 10:05 |
| 47 | 00110100 | 100 | 0 | 110 | 0 | 10010 | 10:05 |

The left-hand column is provided for convenience in connection with the following explanation. For purposes of this chart, the transmission interval for query signal 24 is one minute. Two participants are in the audience (see the ID Code column). The time of detection for both is at 9:45 despite the relative delay therebetween caused by circuit 27 because such delay is in the nature of milliseconds. Also, the "Supplemental Information Requested?" column and the "Reward Requested?" column need have only a single bit that is toggled (rather than the three bits that constitute the code itself), and its value depends on whether an appropriate request code was received. A "1" indicates that a request code has been received.

In lines 1 and 2, no supplementary material is available, as indicated by the numerals "000". In lines 3 and 4, supplemental information is available as evidenced by the detected supplemental information code, but neither of the participants has requested it. In lines 13 and 14, a new code appears indicative of different supplemental information, and now one of the participants has requested it (line 13). No reward has been requested even though it is available.

In lines 45 to 47, there are several new elements. A new program code appears, probably because a new TV show began at 10:00. Also, a new participant has joined the audience (see ID code at line 47). Moreover, new supplemental information is available, and a new reward is also available. One of the participants has requested only the reward (line 45), another participant has requested both the supplemental information and the reward (line 46), and the third participant has requested neither (line 47).

The information in this chart, which is merely an illustration of how it is stored in memory, is usable to provide the participants with interactive access to the supplementary materials in the following ways. Firstly, those rewards which have had their printing data pre-stored in memory 153 will be printed on printer 151 immediately. The participant need do nothing, other than to click button 101. Everything else is done automatically in accordance with the present invention based on data pre-stored by the advertiser and/or an entity (e.g. a TV network) implementing the invention. Secondly, the supplemental information and/or the rewards requested by participants are stored in association with the ID codes of the respective participants. The ID code is a key to each participant's pre-stored profile which is used to find email and/or mail addresses to which the supplemental materials can be sent, as explained below in greater detail. Again, it is to be noted that access to these materials is made interactively as button 101 is clicked by the participant and with the required data being automatically gathered and stored in accordance with the invention. No memorization, writing or other intervention by the participant is required. Although access is interactive in that during the broadcast of the program the participant is informed that supplementary materials are available, the participant can request them, and the required data to satisfy that request is then immediately collected, it should be understood that actual delivery of the requested supplementary materials can occur later, even via mail, as explained below.

In addition to the interactive capability to gain access to supplementary materials which is afforded by the information in the chart, such information is also highly valuable in terms of the audience survey analysis which it makes possible. With the audience survey technique of U.S. Ser. No. 09/519,248 valuable insight can be gained regarding who is watching what and when. However, the present invention adds to that a further indicator of whether the participant was so affected by the advertisement that it moved him to request the supplementary material. Thus, the fact that a participant registered a request for supplementary materials is useful as an indicator of the level of interest created by the advertisement, for example.

With this information the advertiser can determine the show in which the advertisement is most effective by monitoring how many requests were recorded during its performance relative to other shows. Also, the data available with this invention will reveal which type of audience (as determined from the participant profiles) is most receptive to a particular advertisement. Furthermore, the best length for the commercial can be determined by, for example, monitoring the number of requests recorded during a 30 second commercial relative to a one minute commercial. In addition, wearout can also be monitored. A commercial's effectiveness wears out over time as viewers become familiar with it and mentally "tune it out" or actually even "zap" it.

A decreasing number of such requests can be an indicator of wearout. These and other analyses which can be highly valuable are made possible by the unique combination of knowing who is in the audience (i.e. their profile) and whether they requested any supplementary materials.

Memory 36 is of relatively low capacity and is used for short term storage of data. It is desirable to transfer information from such short term memory into a long term memory. That long term storage function is performed by memory 42. The transfer of information from memory 36 to memory 42 is triggered by data transfer control circuit 41 based on any one of the following events which define the termination of a measurement period. Firstly, such transfer can be triggered by each detection of a surveying code received from code detector 40. Secondly, such transfer can be triggered by termination of the receive period for the ID signals. Thus, each time all of the ID signals from the portable devices 7A are detected responsive to the query signal, such data together with the stored surveying codes will be transferred to memory 42. Thirdly, clock 20 can be used to actuate such transfer at predetermined measurement intervals.

The measurement period is determined based on the length of a program segment for which survey data is of interest. A finer measurement can be obtained by reducing the measurement period to limit the stored data to a program segment duration of interest, and vice versa. It is also possible to use the clock for controlling the storage of data during only a predetermined program segment, as opposed to doing so at repeated intervals. Data transfer control circuitry 41 in FIG. 2 performs the above-described operations that are also illustrated at 80 and 82 in FIG. 4B.

Once information has been stored in long term memory 42, it is necessary to download such information to the central processing station 50. Download control circuitry 44 is provided for such purpose, and its function is illustrated by 84 in FIG. 4B. The download control trigger signal 45 can be generated at preset intervals or at a preset time of day by clock 20, at any time by the manual operation of depressing a key, and/or by a remote trigger signal 90 provided, for example, from the central processing station on communications link 88. When the download control 44 produces its output control trigger signal 45, suitable download apparatus 46, such as a modem, will proceed to effect the transmission of data via communications link 88 from memory 42 to the central processing station 50, as at 86 (FIG. 4B). The details of how this is implemented are well known and, thus, need not be described herein.

One operational feature of the above-described arrangement is to enable the entry of data into stationary apparatus 5A from central processing station 50, as via communications link 88. This remote entry can be used, for example, to conveniently load the pre-stored codes into memories 34 and 147 and the printing data into memory 153. It can also be used to pre-store surveying codes into code detector 40 for use in detecting the codes of interest. Various other settable parameters stored in stationary apparatus 5A and/or portable devices 7A (possibly via a suitable docking device on apparatus 5A, not shown) can be set in this manner to provide added convenience and flexibility as features of the invention.

As has been described above, central processing station 50 receives the data stored in memory 42 via communication apparatus 46 and communication link 88. The above-presented chart illustrates what is stored in memory 42 and transferred to central processing station 50. The latter also has stored therein the profile data on each participant and all the codes necessary to operate the invention in the manner described above. Central processing station 50 comprises computerized equipment required to perform these tasks. Such equipment is conventional, well known, and readily apparent to anyone with ordinary skill in the art. It includes a CPU, input devices (e.g. a keyboard), storage devices (e.g. a CD-ROM), a video screen, communication devices (e.g. a modem), storage media (e.g. a floppy disk), and so on.

Figure 6:
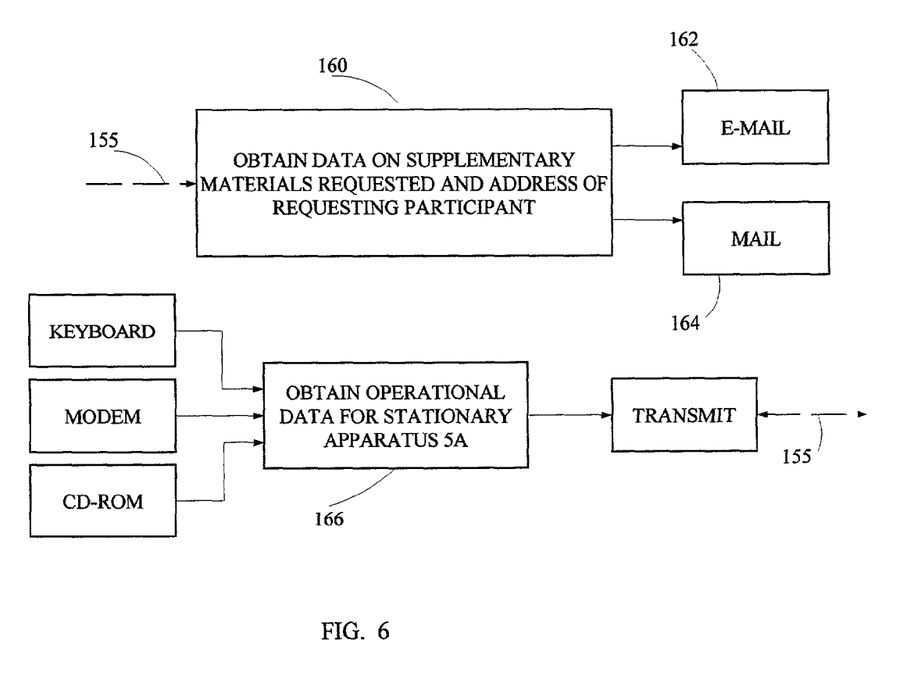
FIG. 6 shows data input devices and a flow chart of operations performed by the advertiser server.

In accordance with the present invention, and as illustrated in FIG. 6, central processing station 50 extracts certain data from that which is stored therein and transmits it via communications link 155 to advertiser server 100. (This could also be done with the advertiser server 100 accessing and retrieving such information from the central processing station). This data makes it possible to provide the participant with the requested supplementary material which is unavailable immediately upon request for printing by printer 151. Therefore, the downloaded data includes the supplemental information code and/or the reward code extracted from signal 4A. It also includes address information from the participant's profile, based on the ID code, which is stored in central processing station 50. The address of the participant can be an email and/or a street address.

Turning now to the advertiser server 100, it should be noted that this terminology has been selected for convenience rather than necessarily for total technical accuracy. In particular, the supplementary materials need not originate from an advertiser, e.g. a merchant. As has been pointed out above, the source of these materials can be an educational institution, private organizations, government organizations, corporations, and so on. Also, the use of "server" may not necessarily accurately denote the equipment in the strict technical definition. The intent of choosing this terminology is to convey that the apparatus is a computerized system capable of receiving, storing, processing and transmitting data signals, for example.

Thus, when advertiser server 100 obtains the data from central processing station 50, as per step 160 and via link 155, the requested supplemental materials are e-mailed, per step 162, and/or mailed, per step 164, to the participant depending on what type of address has been supplied and on the nature of the requested materials. For example, some material may not lend itself to being e-mailed. On the other hand, it is preferable to e-mail as much as possible because of the relatively quick response time and perhaps also because of the convenience to the participant of having an electronic version. Of course, other types of communication besides email and mail are also contemplated, such as the use of fax capabilities.

Advertiser server 100 can also be used to obtain from various input sources the operational data required for stationary apparatus 5A, as per step 166. This is uploaded to central processing station 50 via link 155 and, as appropriate, to statutory apparatus 5A via link 88.

Although a preferred embodiment of the present invention has been described in detail above, various modifications thereto will be readily apparent to anyone with ordinary skill in the art. For example, memories 34, 36, 42, 147 and 153 in statutory apparatus 5A can be combined. Also, the use of delay circuit 27 can be replaced by other well known means to avoid signal interference among portable devices 7A. Furthermore, with the advent and widespread use of the Internet, substantially instant download is possible, thus doing away with the need for at least long term memory 42. In fact, some of the operations described above as occurring completely locally at stationary apparatus 5A could be accomplished with suitable communications between stationary apparatus 5A and central processing station 50.

The generation of query signal 24 which triggers signal 25A at preset, regular intervals tends to run down the battery in portable device 7A. One option is to keep portable device 7A normally dormant so that no signal 25A is transmitted. A query signal 24A is generated only when a program code is detected, as per step 73 (FIG. 4A). When that occurs, a query signal 24 is emitted to trigger a signal 25A in return. This less frequent operation of portable device 7A can substantially lengthen its battery life.

A significant variation is elimination of the query signal 24. Instead, portable devices 7A are designed to emit their ID signals at preset intervals rather than being triggered to do so by the query signal. Also, the ID code, reward request code and supplemental information request code could be transmitted immediately upon actuation of button 101 to print the coupon. As an added note, these codes need not be transmitted together.

The frequency with which the query signal is generated is a matter of engineering choice depending on the memory capacity to be made available for storing the various codes versus the perceived importance of the need to have the most updated information regarding the audience. Thus, if the duration of the transmission interval for query signal 24 is selected to be one minute, for example, accurate data will be available promptly after any member of the audience leaves the room. However, this comes at the cost of requiring a higher memory capacity than would be needed, for example, if such duration were to be selected at 15 minutes.

Also, the query signal can be transmitted "periodically" at any regular and/or irregular intervals. It is mainly necessary to keep track of such query signal transmissions so that the signals from portable devices 7A triggered in response thereto are identifiable. For the above-identified embodiment which does not utilize such a query signal, the ID signals can also be emitted "periodically" at regular and/or irregular intervals, the key point being that they are detected by the stationary apparatus.

It must also be appreciated that the interactive access to supplementary materials can be implemented without being combined with the audience surveying features. The interactive access provides many advantages on its own, not only when combined with audience surveying. Under such conditions it may less significant to use the wireless approach described above for communicating between code re-transmission source 3 and stationary apparatus 5A. Therefore, a direct wired connection can be used.

Other possible variations include use of printer 151 to print supplemental information in place of or in addition to the printing of rewards. Also, indicators 103 and 105 can be eliminated by coupling the output of stationary apparatus 5A to the TV inputs so that an icon, for example, is displayed on the screen to provide an effect equivalent to the effect of the indicators. Indicators 103 and 105 can also be replaced by indicators on the watches worn by the participants. In addition, manual actuation of button 101 can be replaced by voice commands, for example. Furthermore, the sequence of steps in the flow charts depicted in the drawings can be modified with equivalent results. Also, the program code can be eliminated from broadcast output signal 2A for broadcasts other than of the playback type, such as for radio and TV. By keeping track of the date and time when the supplemental material codes are received, as shown in the chart presented above, the date and time information can be used in a self-explanatory way to identify the program which was being broadcast at the time of interest.

These and other such modifications are intended to fall within the scope of the present invention as defined by the following claims.

We claim:

1. A method for interactively with a broadcast program that is being performed enabling access to supplementary materials related to the program, comprising:
    obtaining a programming signal;
    obtaining a supplementary material signal that identifies the program-related supplementary material;
    combining said programming signal and said supplementary material signal into an output signal;
    broadcasting said output signal from a program signal source;
    receiving said broadcast output signal at a location of an audience;
    performing for the audience said programming signal of the received output signal, with reproduction equipment;
    extracting a signal related to said supplementary material signal from the received broadcast signal;
    responding to an interactive control signal actuated by a member of said audience tuned to said programming signal being performed, and based on said extracted signal, to enable access to the supplementary material corresponding to said supplementary material signal;
    storing personal identification data in a plurality of portable devices to be carried by a plurality of individuals, respectively;
    transmitting said identification data from the portable devices of said individuals who are audience members at the audience location;
    detecting said transmitted identification data; and
    wherein said step of enabling access to the supplementary material corresponding to said supplementary material signal is based on the detected identification data of the audience member tuned to said programming signal being performed who actuated said interactive control signal.

2. The method of claim 1, wherein said supplementary material is at least one of supplementary information and an incentive reward coupon, and wherein said supplementary material signal is a code for at least one of said supplementary information and said incentive reward coupon.

3. The method of claim 2, wherein said access to said stored supplementary material comprises outputting the supplementary material in human-perceptible form.

4. The method of claim 3, wherein said step of outputting the supplementary material in human-perceptible form comprises printing said supplementary material at the audience location.

5. The method of claim 3, wherein said step of outputting the supplementary material in human-perceptible form comprises transmitting said extracted signal to a location, remote from the audience location, where data for outputting the supplementary material in human-perceptible form is stored, and sending the outputted supplementary material to the audience location.

6. The method of claim 5, wherein said step of sending the outputted supplementary material to the audience location comprises at least one of mail and email.

7. The method of claim 5, wherein at least one of the steps of transmitting said extracted signal to the remote location and sending the outputted supplementary material to the audience location comprises using a global communication network.

8. The method of claim 3, wherein data for printing said supplementary material is pre-stored at said audience location.

9. The method of claim 1, wherein said control signal is generated by a handheld, remote control device.

10. The method of claim 1, further comprising interactively generating an indication responsive to said supplementary material signal being received at the audience location to alert the audience that access to such supplementary material is available.

11. The method of claim 10, wherein said indication is visual.

12. The method of claim 1, wherein said step of detecting said transmitted identification data comprises:
periodically emitting a trigger signal at the audience location;
in response to said trigger signal, transmitting said identification data from the portable devices of said individuals who are audience members at the audience location.

13. The method of claim 1, wherein the access to the supplementary material that is enabled based on the detected identification data of the audience member who actuated the control signal comprises determining which of several types of available supplementary materials to provide.

14. The method of claim 1, wherein the access to the supplementary material that is enabled based on the detected identification data of the audience member who actuated the control signal comprises determining where the supplementary materials should be sent.

15. The method of claim 1, further comprising producing an audience survey based on the detected identification data of the audience member who actuated the control signal and the supplementary material signal associated with said programming signal being performed when the control signal was actuated.

16. A method for interactively with a broadcast program that is being performed enabling access to supplementary materials related to the program from a broadcast signal that is a combination of a programming signal and a supplementary materials signal, said method comprising:
receiving said broadcast output signal at a location of an audience;
performing for the audience said programming signal of the received output signal, with reproduction equipment;
extracting a signal related to said supplementary material signal from the received broadcast signal;
responding to an interactive control signal actuated by a member of said audience tuned to said programming signal being performed, and based on said extracted signal, to enable access to the supplementary material corresponding to said supplementary material signal;
storing personal identification data in a plurality of portable devices to be carried by a plurality of individuals, respectively;
transmitting said identification data from the portable devices of said individuals who are audience members at the audience location;
detecting said transmitted identification data; and
wherein said step of enabling access to the supplementary material corresponding to said supplementary material signal is based on the detected identification data of the audience member tuned to said programming signal being performed who actuated said interactive control signal.

17. The method of claim 16, wherein said supplementary material is at least one of supplementary information and an incentive reward coupon, and wherein said supplementary material signal is a code for at least one of said supplementary information and said incentive reward coupon.

18. The method of claim 17, wherein said access to said stored supplementary material comprises outputting the supplementary material in human-perceptible form.

19. The method of claim 18, wherein said step of outputting the supplementary material in human-perceptible form comprises printing said supplementary material at the audience location.

20. The method of claim 19, wherein data for printing said supplementary material is pre-stored at said audience location.

21. The method of claim 18, wherein said step of outputting the supplementary material in human-perceptible form comprises transmitting said extracted signal to a location, remote from the audience location, where data for outputting the supplementary material in human-perceptible form is stored, and sending the outputted supplementary material to the audience location.

22. The method of claim 21, wherein said step of sending the outputted supplementary material to the audience location comprises at least one of mail and email.

23. The method of claim 21, wherein at least one of the steps of transmitting said extracted signal to the remote location and sending the outputted supplementary material to the audience location comprises using a global communication network.

24. The method of claim 16, wherein said control signal is generated by a handheld, remote control device.

25. The method of claim 16, further comprising interactively generating an indication responsive to said supplementary material signal being received at the audience location to alert the audience that access to such supplementary material is available.

26. The method of claim 25, wherein said indication is visual.

27. The method of claim 16, wherein said step of detecting said transmitted identification data comprises:
periodically emitting a trigger signal at the audience location;
in response to said trigger signal, transmitting said identification data from the portable devices of said individuals who are audience members at the audience location.

28. The method of claim 16, wherein the access to the supplementary material that is enabled based on the detected identification data of the audience member who actuated the control signal comprises determining which of several types of available supplementary materials to provide.

29. The method of claim 16, wherein the access to the supplementary material that is enabled based on the detected identification data of the audience member who actuated the control signal comprises determining where the supplementary materials should be sent.

30. The method of claim 16, further comprising producing an audience survey based on the detected identification data of the audience member who actuated the control signal and the supplementary material signal associated with said programming signal being performed when the control signal was actuated.

31. An apparatus for interactively with a broadcast program that is being performed enabling access to supplementary materials related to the program, comprising:
means for obtaining a programming signal;

means for obtaining a supplementary material signal that identifies the program-related supplementary material;

means for combining said programming signal and said supplementary material signal into an output signal;

means for broadcasting said output signal from a program signal source;

means for receiving said broadcast output signal at a location of an audience;

means for performing for the audience said programming signal of the received output signal, with reproduction equipment;

means for extracting a signal related to said supplementary material signal from the received broadcast signal;

means for responding to an interactive control signal actuated by a member of said audience tuned to said programming signal being performed, and based on said extracted signal, to enable access to the supplementary material corresponding to said supplementary material signal;

means for storing personal identification data in a plurality of portable devices to be carried by a plurality of individuals, respectively;

means for transmitting said identification data from the portable devices of said individuals who are audience members at the audience location;

means for detecting said transmitted identification data; and wherein said means for enabling access to the supplementary material corresponding to said supplementary material signal is based on the detected identification data of the audience member tuned to said programming signal being performed who actuated said interactive control signal.

32. An apparatus for interactively with a broadcast program that is being performed enabling access to supplementary materials related to the program from a broadcast signal that is a combination of a programming signal and a supplementary materials signal, said apparatus comprising:

means for receiving said broadcast output signal at a location of an audience;

means for performing for the audience said programming signal of the received output signal, with reproduction equipment;

means for extracting a signal related to said supplementary material signal from the received broadcast signal;

means for responding to an interactive control signal actuated by a member of said audience tuned to said programming signal being performed, and based on said extracted signal, to enable access to the supplementary material corresponding to said supplementary material signal;

means for storing personal identification data in a plurality of portable devices to be carried by a plurality of individuals, respectively;

means for transmitting said identification data from the portable devices of said individuals who are audience members at the audience location;

means for detecting said transmitted identification data; and wherein said means for enabling access to the supplementary material corresponding to said supplementary material signal is based on the detected identification data of the audience member tuned to said programming signal being performed who actuated said interactive control signal.

33. The apparatus of claim 32, wherein said supplementary material is at least one of supplementary information and an incentive reward coupon, and wherein said supplementary material signal is a code for at least one of said supplementary information and said incentive reward coupon.

34. The apparatus of claim 33, wherein said means for enabling access to said stored supplementary material comprises means for outputting the supplementary material in human-perceptible form.

35. The apparatus of claim 34, wherein said means for outputting the supplementary material in human-perceptible form comprises means for printing said supplementary material at the audience location.

36. The apparatus of claim 35, wherein said means for outputting the supplementary material in human-perceptible form comprises means for transmitting said extracted signal to a location, remote from the audience location, where data for outputting the supplementary material in human-perceptible form is stored, and means for sending the outputted supplementary material to the audience location.

37. The apparatus of claim 36, wherein said means for sending the outputted supplementary material to the audience location comprises at least one of mail and email.

38. The apparatus of claim 35, further comprising means for storing data for printing said supplementary material at said audience location.

39. The apparatus of claim 36, wherein at least one of the means for transmitting said extracted signal to the remote location and means for sending the outputted supplementary material to the audience location uses a global communication network.

40. The apparatus of claim 32, wherein said control signal is generated by a handheld, remote control device.

41. The apparatus of claim 32, further comprising means for interactively generating an indication responsive to said supplementary material signal being received at the audience location to alert the audience that access to such supplementary material is available.

42. The apparatus of claim 41, wherein said indication is visual.

43. The apparatus of claim 32, wherein said means for detecting said transmitted identification data comprises:

means for periodically emitting a trigger signal at the audience location; and in response to said trigger signal, means for transmitting said identification data from the portable devices of said individuals who are audience members at the audience location.

44. The apparatus of claim 32, wherein the means for enabling access to the supplementary material based on the detected identification data of the audience member who actuated the control signal comprises means for determining which of several types of available supplementary materials to provide.

45. The apparatus of claim 32, wherein the means for enabling access to the supplementary material based on the detected identification data of the audience member who actuated the control signal comprises means for determining where the supplementary materials should be sent.

46. The apparatus of claim 32, further comprising means for producing an audience survey based on the detected identification data of the audience member who actuated the control signal and the supplementary material signal associated with said programming signal being performed when the control signal was actuated.

* * * * *